Dec. 6, 1966 SHIRO OKAMURA 3,290,438

RECORDING AND REPRODUCING SYSTEM HAVING REDUNDANT RECORDING AND SELECTIVE REPRODUCTION

Filed Oct. 25, 1963 5 Sheets-Sheet 1

INVENTOR.
SHIRO OKAMURA

BY Hopgood & Calimafde
ATTORNEYS

INVENTOR.
SHIRO OKAMURA

BY

Hopgood & Calimafde
ATTORNEYS

INVENTOR.
SHIRO OKAMURA
BY
Hopgood & Calimafde
ATTORNEYS

INVENTOR.
SHIRO OKAMURA

BY

Hopgood & Calimafde
ATTORNEYS

INVENTOR.
SHIRO OKAMURA
BY
Hopgood & Calimafde
ATTORNEYS

United States Patent Office 3,290,438
Patented Dec. 6, 1966

3,290,438

RECORDING AND REPRODUCING SYSTEM HAVING REDUNDANT RECORDING AND SELECTIVE REPRODUCTION

Shiro Okamura, 26 Nichome, Shiba Shirokane, Daimachi, Minatoku, Tokyo, Japan

Filed Oct. 25, 1963, Ser. No. 319,002
13 Claims. (Cl. 178—6.6)

This invention relates to a tape recording and reproducing system, and has particular application to a video tape recording system wherein a video signal is recorded by means of a rotating head assembly, the rotation of which does not perfectly synchronize with the synchronizing pulse of the video signal in phase or frequency.

In prior art video tape recording systems, accurate synchronization of the rotation of the head assembly to the video signal vertical synchronizing pulse is necessary during recording so that discontinuity at the tape edge will not affect the reproduced signal. This consideration is of particular importance in single head and in two head video tape recorders which have oblique recording tracks on the tape arranged parallel to one another, each of which corresponds to one field or frame. In such cases the tape edges coincide with the vertical blanking portion thus avoiding the effect of discontinuity at the tape edge.

In power line synchronizing systems which are often employed, the vertical frequency is synchronized with the frequency of the power line, and it would therefore first appear that the rotating head motor may be directly driven by the power source if a synchronous motor is used. However, the rotating head system is subject to some jitter and the tape transport is subject to wow and flutter. As a consequence it is sometimes impossible to accurately record the vertical blanking portion at the tape edges with a simple synchronous motor.

In the power line asynchronous system the conditions are even worse. The deviation existing between the speed of the rotating head and the frequency of the power line makes the location of the vertical blanking portion quite random with respect to the tape edges.

The prior art devices for recording the vertical blanking portion accurately at the tape edges employ motor control means having a feedback network. A pulse generated from the rotating head system is compared in phase with the vertical synchronizing pulse and the phase difference detected therefrom is fed to a variable frequency oscillator. The output of the oscillator is fed to a motor, the rotating phase of which is corrected by suitable motor control means. Such an arrangement necessitates a high power oscillator or control means, which makes the equipment bulky and expensive.

Accordingly, it is an object of this invention to provide a recording system which does not require the servo control systems for the head assembly motor that is required in conventional systems.

It is a further object of this invention to provide a novel system for recording a video type signal in a pattern of parallel recorded signal paths arranged in an oblique direction on a tape without disturbing the tape edges.

A still further object of this invention is to reduce the size and cost of video signal recording and reproducing systems.

Figure 1A:
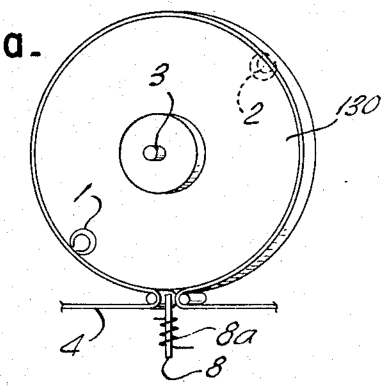
Figure 1B:
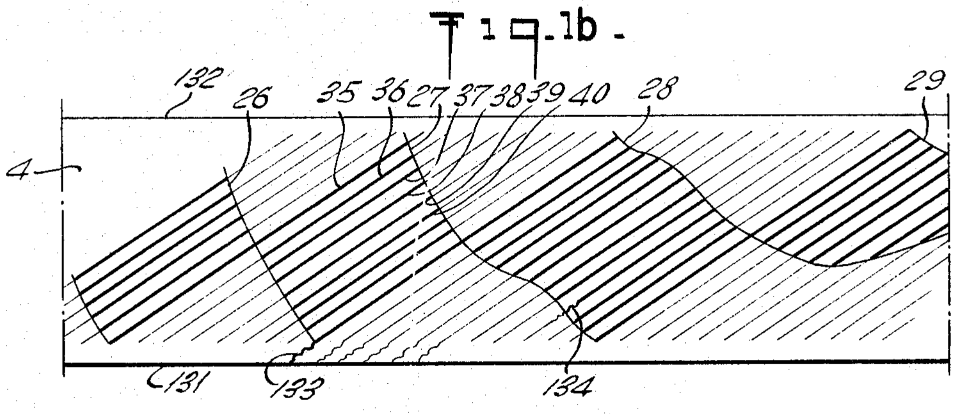
Figure 2A:
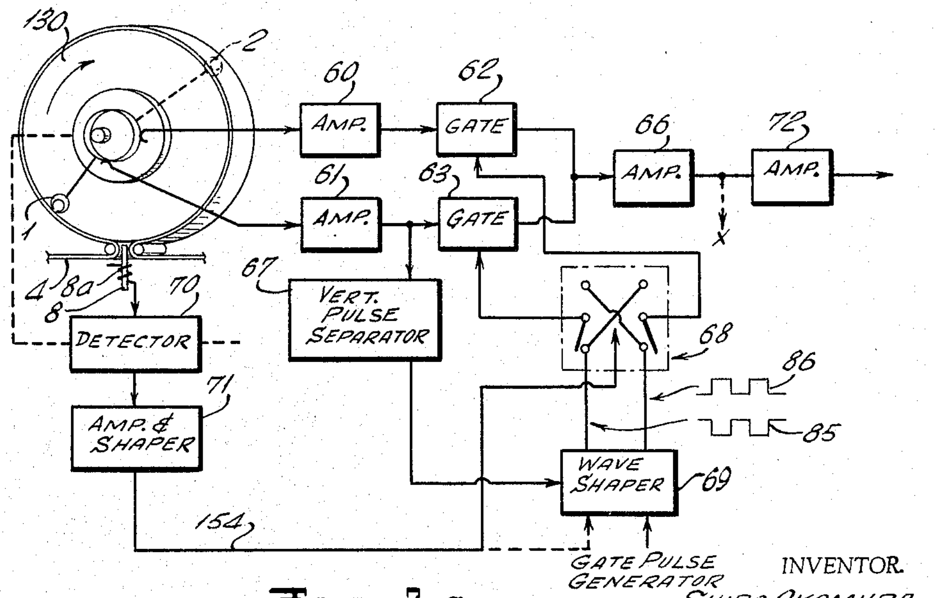
Figure 2B:
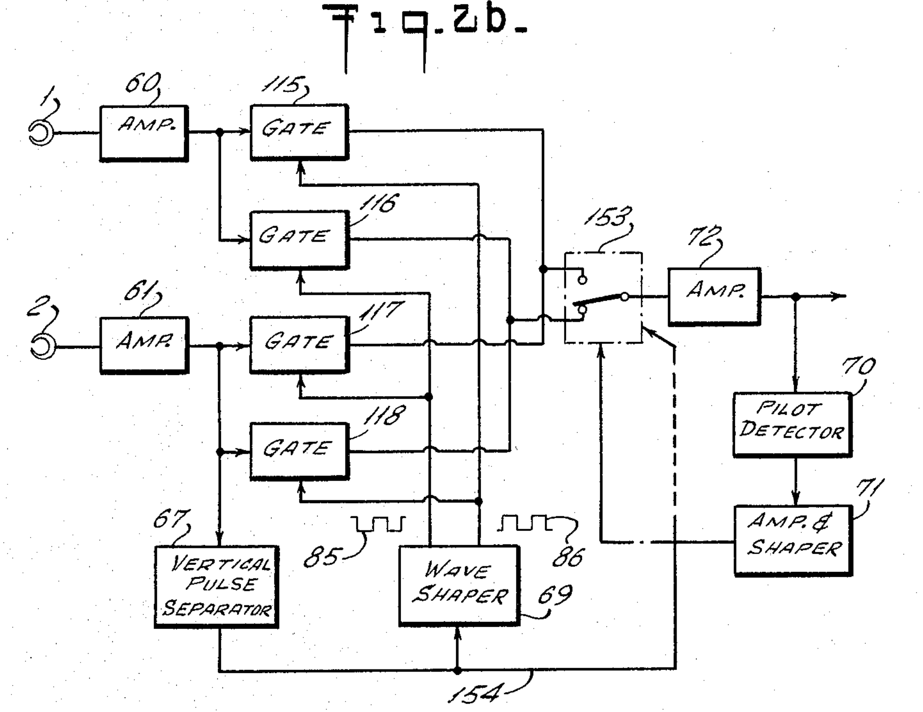
Figure 3A:
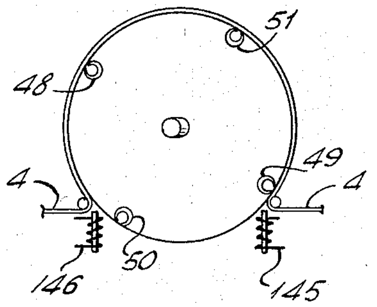
Figure 3B:
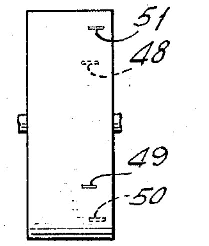
Figure 3C:
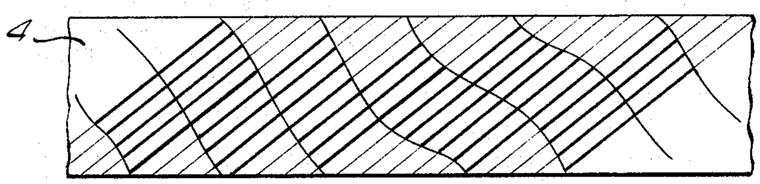
Figure 4:
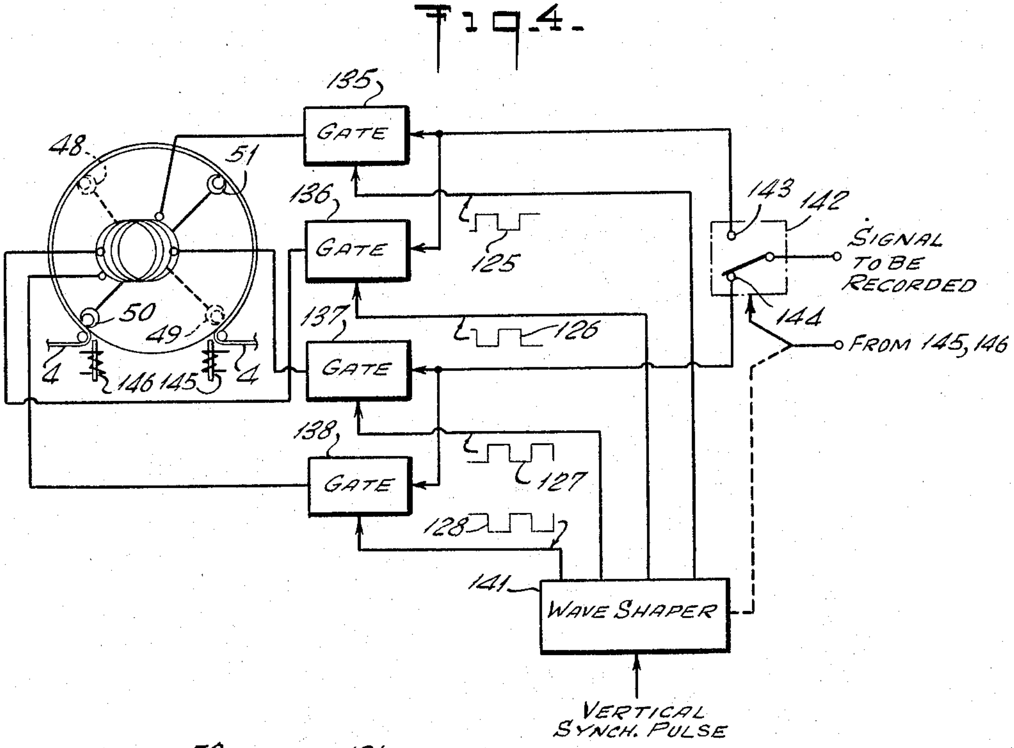
Figure 5:
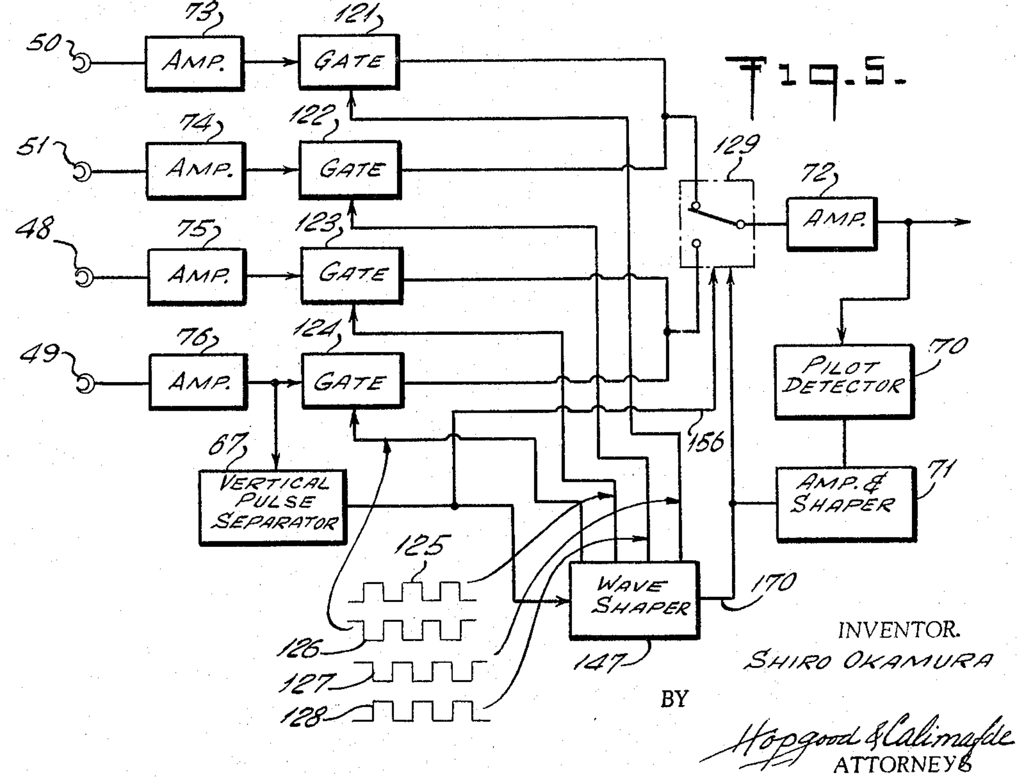
Figure 6A:
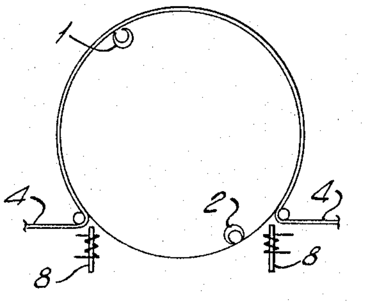
Figure 6B:
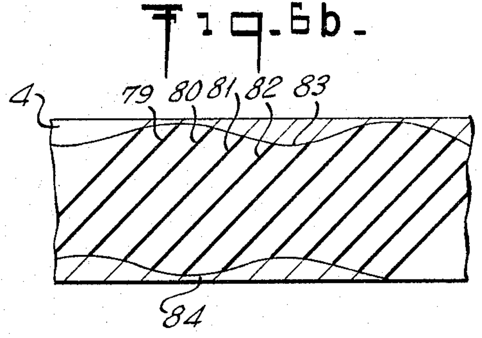
Figure 7:
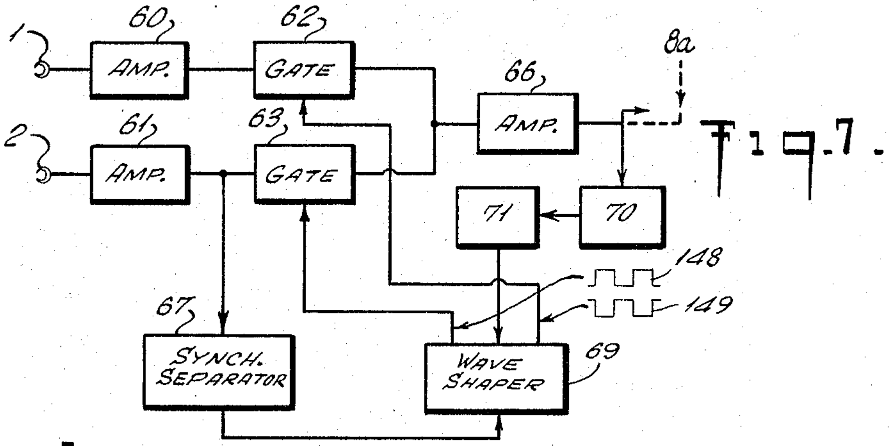
Figure 8A:
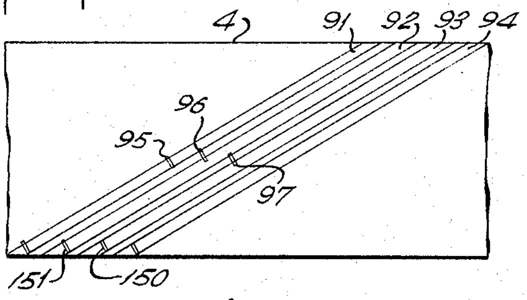
Figure 9:
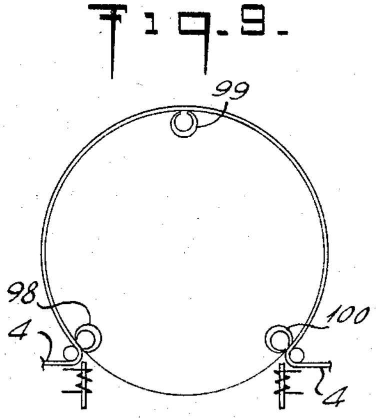
Figure 8B:
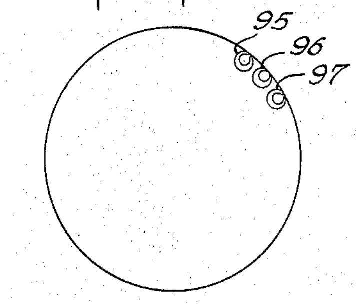
Figure 8C:
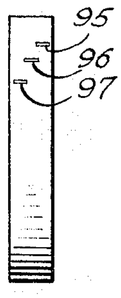
Figure 8D:
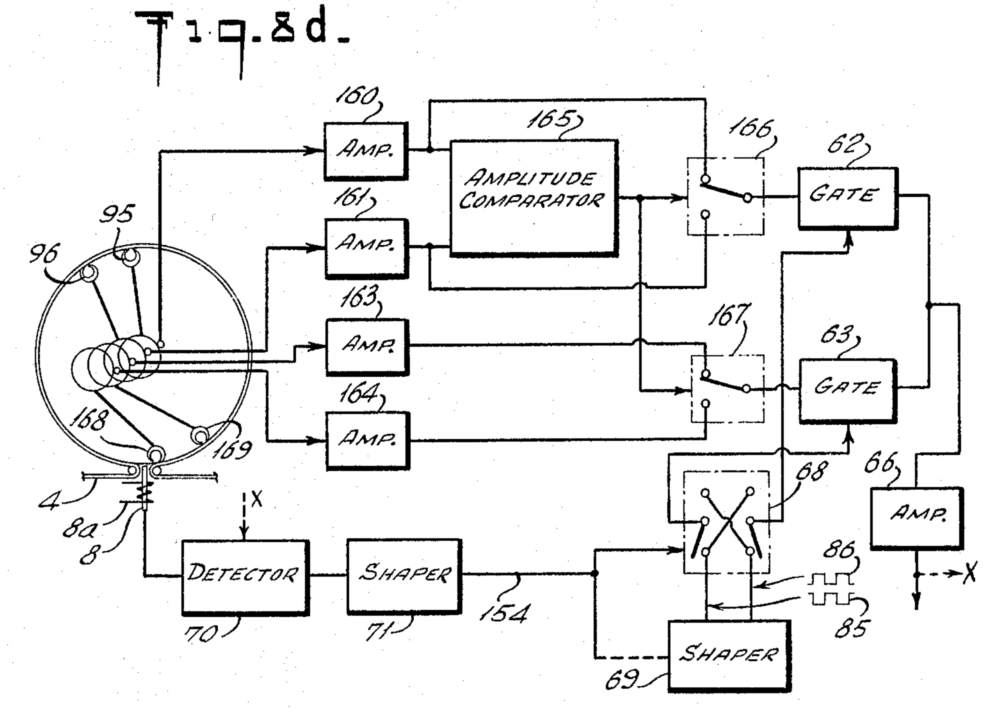
Figure 10A:
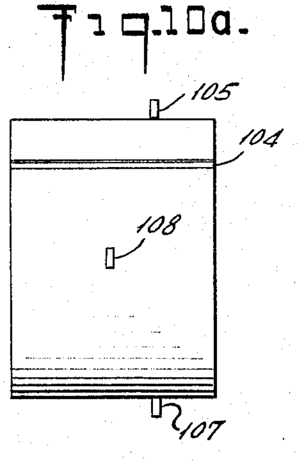
Figure 10B:
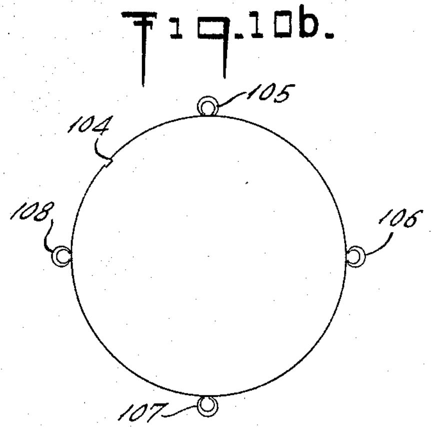
Figure 10C:
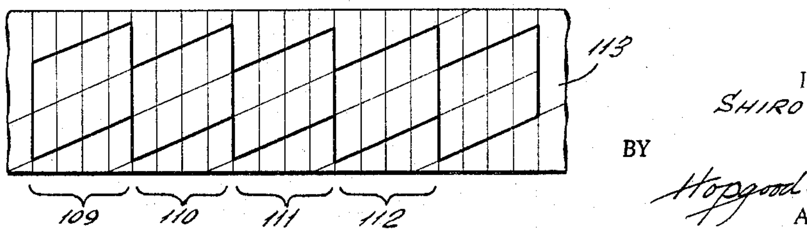

All of the objects, features and advantages of this invention and the manner of attaining them will become more apparent and the invention itself will be best understood by reference to the following description of an embodiment of the invention taken in conjunction with the accompanying drawing, in which FIG. 1*a* shows in elevation a schematic arrangement of a two head video tape recorder mechanism according to the present invention, FIG. 1*b* shows an example of the recorded pattern produced by means of the apparatus of FIG. 1*a* in accordance with the invention, FIG. 2*a* shows a simplified schematic of a recording head switching circuit suitable for use with the apparatus of FIG. 1*a*, FIG. 2*b* shows a modified version of the circuit of FIG. 2*a*, FIG. 3*a* shows a side view of a modification of the apparatus of FIG. 1*a*, FIG. 3*b* is an end view of the rotatable head assembly of FIG. 3*a*, FIG. 3*c* shows an example of the recorded pattern produced by means of the apparatus of FIGS. 3*a* and 3*b*, in accordance with the invention, FIG. 4 shows a head switching circuit suitable for use with the apparatus of FIGS. 3*a* and 3*b* during recording, FIG. 5 shows an example of a switching circuit for use with the apparatus of FIGS. 3*a* and 3*b* during playback or reproduction of the recorded signal, FIG. 6*a* shows another modification of the apparatus of FIG. 1*a*, FIG. 6*b* shows an example of the recorded pattern produced by means of the apparatus of FIG. 6*a* in accordance with the invention, FIG. 7 shows in block form one circuit suitable for use with the apparatus of FIG. 6*a*, FIG. 8*a* shows a head system arrangement for tracking the recorded paths or tracks in a complementary manner according to the invention, FIG. 8*b* is a side view of a mechanical rotating head assembly for carrying out the arrangement shown in FIG. 8*a*, FIG. 8*c* shows an end view of the assembly of FIG. 8*b*, FIG. 8*d* shows an example of a switching circuit in block schematic form suitable for use with the system of FIG. 8*a*, FIG. 9 shows still another example of a recording apparatus arrangement in accordance with the invention, FIG. 10*a* shows a still further example of a recording apparatus arrangement in accordance with the invention, FIG. 10*b* shows a side view of the apparatus of FIG. 10*a*, and FIG. 10*c* is an example of the recorded pattern produced by the apparatus of FIG. 10*a*.

Briefly, this invention involves the concept of arranging the recorded tracks in somewhat duplicate form on a movable recording medium such as a tape so that a portion of the recorded signal which is interrupted at the edge of the tape can be reproduced by a duplicate or redundant recorded track edge, which is not interrupted by the tape edge for any deviation of phase or velocity between the head rotation and the vertical synchronizing pulse.

According to the present invention there is provided a recording and reproducing system for recording on a recording medium an approximately periodical signal, such as a video signal, within predetermined boundaries on the medium for future reproduction of a replica of the signal. This system comprises recording and reproducing transducer means, and scanning means for causing the transducer means to scan the recording medium relative thereto to define a pattern of substantially parallel recorded signal paths having their ends substantially at said boundaries. The system further includes transporting means for moving the recording medium relative to the transducer means and in a direction intersecting the signal paths, each of these paths being arranged to have a length which corresponds to at least one of the approximate periods of the periodical signal. Additionally, the pattern is arranged to contain a redundant scan corresponding to the predicted maximum deviation during a predetermined time interval of any one of the frequency, the phase, or both of the scan from the corresponding one of the frequency, the phase, or both of the periodical signal. The system also includes selecting means connected to the transducer means for sequentially selecting at least one of the approximate periods, and detecting means for detecting the said boundaries to operate the selecting means.

Referring now to FIG. 1*a*, there is shown schematically one type of video tape recorder mechanism in which a movable tape 4 is wound around a cylindrical guide 130 and is scanned obliquely by means of a rotating head assembly having a skewed axis 3. Such apparatus may employ a single head, or double heads, as indicated by the numerals 1 and 2. If the tape is wound around approximately 360 degrees, it is usually necessary to employ only one rotating head. If the tape is wound around approximately 180 degrees, two rotating heads are employed.

In the present invention, however, a greater number of rotating heads is employed than would be usual in a similar device of the prior art. Thus in FIG. 1*a*, only one head is necessary since the tape winding is approximately 360°, however, two heads are employed. As a result, for a given number of rotating heads the angle of winding of the tape around the guide cylinder is larger than in the prior art arrangement. This arrangement produces a recorded signal pattern having redundant recorded signal paths or tracks, as will be seen.

When the rotating velocity of the rotating head assembly is different from the vertical frequency of the video signal to be recorded, the recorded track pattern may be as shown in FIG. 1*b*. In FIG. 1*b*, the curves 26, 27, 28 and 29 represent the envelope of the vertical blanking portion of the video signal which are seen to be generally not parallel to the tape edges. This is due to the difference between the rate of rotation of the head assembly and the vertical frequency. Each of the parallel pattern lines 35–40 in FIG. 1*b* represents one track. The portions of the recorded tracks as shown by the thicker line sections between the vertical blanking curves 26 and 27, for example, each represent one field of the video signal. It will be observed, however, that the total length of each track 35, 36, 37 . . . is twice that of the thicker line sections between the curves 26 and 27, so that each track 35, 36, 37 . . . contains two fields. The field represented by the thinner portion of each line 35, 36, 37 . . . is a redundant field having identical information to that in the thicker portion of each of these lines. As a result, at any time there exists one complete field which does not coincide with the tape edge portions 131 and 132. This is a result of employing two heads rather than only one for a tape winding of 360°. The recording may be accomplished by the two heads 1 and 2 simultaneously excited.

FIG. 2*a* shows one form of a circuit for selecting complete fields during reproduction or playback. The output of the heads 1 and 2 is fed to gates 62 and 63, respectively, which are gated by suitable gate pulses 85 and 86. These pulses 85 and 86 are generated by a wave shaper 69 and fed to the gates 62 and 63 through a switch 68. The wave shaper 69 is synchronized with vertical synchronizing pulses derived from a vertical synchronizing pulse separator 67 which is fed from the output of the amplifier 61, but may also be fed from any other suitable point. The outputs of the gates 62 and 63 are added and fed to an amplifier 66. In order that a track of one field that does not contain the tape edge may be selected automatically, a suitable marker signal 133, see especially FIG. 1*b*, is recorded at one or both edges of the tape. The reproducing head picks up the marker signal and at the instant the marker signal appears in the reproducing signal, e.g. at 134, see FIG. 1*b*, the switch 68 is switched to another position coincident with the vertical blanking period via lead 154, see FIG. 2*a*, thus offsetting the gating condition for gates 62 and 63. This procedure is performed by the pilot signal detector 70 and amplifier and shaper 71, the output of which becomes the switching pulse for the switch 68. The switching pulse via line 154 may be fed directly to wave shaper 69 in which there is provided switching means for switching the output waveforms as described above.

The pilot signal may be a predetermined signal having a constant frequency, preferably in the recorded video band. In the present case the circuit 70 comprises a sharp tuning circuit and a detector. Alternatively, instead of the pilot signal, a fixed magnet 8 may be placed near the edge of the tape 4, as indicated in FIG. 1*a*. The magnet 8 may be excited by a source of suitable frequency fed to the coil 8*a*. The fall of the recorded signal at the tape edge is detected by the circuit 70 of FIG. 2*a* and a trigger pulse may be produced therefrom. This method is particularly suitable for the case of frequency modulation. Any other suitable arrangement can be utilized which discriminates or senses the end of a track 35, 36, 37 . . . or the tape edge. The wave shaper 69 can be directly controlled by the output of the amplifier and shaper circuit 71 so as to switch the output waveform to either pulse 85 or 86.

FIG. 2*b* shows an alternative playback circuit to that of FIG. 2*a*. The output of the amplifiers 60 and 61 are fed to two sets of gates 115, 116 and 117, 118, respectively, the gates of each set being fed with gate pulses of opposite polarity such as indicated by numerals 85 and 86. The outputs from the gates 115 and 117 are connected together, as are the outputs from gates 116 and 118, and are fed to contacts on a switch 153. The switched output is fed to an amplifier 72 as in the circuit of FIG. 2*a*. The circuits 67 and 69 operate in the same manner as in the circuit of FIG. 2*a*.

The heads 1 and 2 may be switched during recording so as to record only that field of the video signal which does not occur at the tape edge. The switching pulse required can be derived from the coil 8*a* in FIG. 2*a*. In certain cases only one head may be employed if intermittent operation is allowable, such as when the reproduced picture occurs every other field or frame. The apparatus of FIG. 1*a* does have the disadvantage of requiring a broad tape having twice the width of tapes usually employed. However, the velocity of tape transportation could be increased if the normal tape width is desired.

FIG. 3*a* shows an example of a rotating head assembly which employs four heads and in which the wrapping angle around the cylinder is decreased. In this arrangement each track contains one and a half picture fields instead of two. This arrangement includes coils 145 and 146 similar to the coil 8*a* of FIG. 1*a*.

FIG. 3*b* shows an end view of the rotating head assembly of FIG. 3*a* in which one opposite pair of heads, for example, 50 and 51, may be placed at an axial distance from another pair 48 and 49 as shown, thus enabling uniform pitch of recording and reproducing.

FIG. 3*c* shows an example of the pattern recorded with the mechanism of FIGS. 3*a* and 3*b*. In the case of recording, the pairs of heads must be switched from one to the other so that a complete field may be selected. The recorded tracks may be arranged alternately for each pair by proper arrangement of the head system.

FIG. 4 shows an example of the switching circuit in block schematic form for use with the arrangement of FIGS. 3*a*, 3*b* and 3*c* during recording. The head pair 50 and 51 are connected by suitable commutators to the gates 136 and 135, respectively. Likewise heads 48 and 49 are connected to gates 137 and 138, respectively. The input leads to the gates 135 and 136 are connected to one pole 143 of a switch 142. In the same manner the other pole 144 is fed to gates 137 and 138. The gates 135–138 are operated by the gating pulses generated from a wave shaper 141 having wave-forms shown in FIG. 4 as 125, 126, 127 and 128. These waves are synchronized with a vertical synchronizing pulse derived in a similar way as in the circuit of FIG. 2*a*. One of the head pairs is selected at the appropriate time by the switch 142 which is controlled by the edge marker or trigger pulse generated from pick-up coils 145 or 146 of FIGS. 3*a* and 4, which switch may also control the wave shaper 141. Thus if a recording head is traversing the tape edge in the energized condition a pulse is generated in the head due to the recording current. This pulse indicates that the head must be switched to another pair. The switching is thus performed and another pair is energized which does not operate near the tape edge.

It is understood that the greater number of heads that are used, the more economically the tape is utilized, that is, if a single track contains one complete field or frame plus a given additional signal Δ, this signal becomes smaller as the number of heads is increased. However, the increase in complexity of the switching circuit will then limit the practical number. Generally, if *n* pairs of heads in a system arranged symmetrically are used, the required number of periods M recorded on the tape will equal approximately $1+2/n$ ($n=0, 2, 4, 6, 8 \ldots$). Therefore if *n* becomes larger M becomes smaller, as described above.

FIG. 5 shows a diagram in block form for effecting playback of the recorded signal pattern of FIG. 3*c*, recorded by the apparatus of FIGS. 3*a* and 3*b*. The output of the heads 50, 51, 48 and 49 are fed respectively to amplifiers 73, 74, 75 and 76, which are connected to gates 121, 122, 123 and 124. These gates are operated by gate pulses having wave forms shown as 125, 126, 127 and 128 in FIG. 5, generated from a wave shaper 147 which is synchronized with the vertical synchronizing pulse generated from the vertical pulse separator 67. The selection of the pair of heads is performed by the switch 129 which is triggered by the detected pilot signal as in the case of FIGS. 2*a* and 2*b*.

The phase of the gate pulse is controlled by the detected pilot signal via lead 170. The coils 145 and 146 of FIGS. 3*a* and 4 may be utilized as the pilot signal generator. Also, the gates 121–124 of the playback circuit of FIG. 5 may serve as the gates 135–138 of the recording circuit of FIG. 4 by proper switching. The wave shapers 141 and 147 may also utilize a common circuit for recording and reproducing. Also, instead of employing the switch 129 the waveforms 125–128 may be controlled by the signal from the amplifier and shaper. It should also be noted that in some cases it may be advantageous to locate two heads at an angular distance of e.g. 135° disposed asymmetrically on a drum.

FIG. 6*a* shows an apparatus in schematic form which is suitable for use in power line synchronized systems. For the two head system the tape wrapping angle may be somewhat smaller than 360 degrees.

FIG. 6*b* shows an example of the pattern recorded with the apparatus of FIG. 6*a*. The curves 83 and 84 show the envelope of the vertical blanking signal, between which the field or frame information tracks 79–82 are recorded. The head motor (not shown) is a synchronous motor which may, however, be subject to some jitter as the curves 83 and 84 indicate. The width of the tape or wrapping angle of the tape can be determined from a knowledge of the maximum jitter to be encountered. The recording may be done by feeding the signal to both heads. This case will correspond to the case of FIG. 3*c* in which the number of periods is smaller than in that case, that is $M<1+2/n$.

FIG. 7 shows the circuit by means of which the heads 1 and 2 of FIG. 6*a* are switched during reproduction or playback. The output of the reproducing heads 1 and 2 are, after amplification in the amplifiers 60 and 61, fed to gates 62 and 63, respectively. These gates are gated by gate pulses 148 and 149 generated from a wave shaper 69 which is synchronized with the vertical synchronizing pulse separated by the synchronous separator 67. Also, in this case it is preferable to detect the edge marker pulse and to switch the wave shaper 69 as in the case of FIG. 3*a*, though it may be omitted if desired. In this case also, additional heads disposed at suitable angles from one another may be employed so that a tape of decreased width may be used, as in the case of FIG. 3*a*.

The present invention thus makes it possible to record and produce the video signal on a tape form medium without servo feedback applied to the head assembly motor. However, during reproduction, the reproducing head must track on the record locus, which does require servo tracking means.

FIG. 8*a* shows a complementary head system as described in my copending application Serial No. 240,258, filed November 27, 1962, for Signal Recording and Reproducing System, which overcomes this difficulty. In FIG. 8*a*, the numerals 95 and 96 designate the gaps of a complementary pair of heads, as also do the numerals 95 and 97. Due to the spatial relationship of these heads and the tracks, it will be seen that if head 95 tracks, head 96 lies between two recorded paths or loci 91 and 92, and vice versa. In the intermediate condition either head 95 or 96 is arranged to operate. At an instant when both heads deviate equally, switching is effected so that the head is developing a decaying signal is switched off, and the head that is developing a growing signal is switched on. This switching is triggered by a pulse, such as one that may be generated from an amplitude comparator for the output of the two heads. Alternatively, the pulse can be delivered from the marker pulse recorded at the edge of the tape, as indicated by the numerals 150 and 151 in FIG. 8*a*; that is, if the two marker pulses, instead of one, are detected by the reproducing head, another head is switched into the circuit. Other means can also be employed, such as for example, comparison of the noise output. It is apparent that the pair consisting of heads 95 and 97 may be used instead of heads 95 and 96.

FIGS. 8*b* and 8*c* show respectively side and end views of the rotating head assembly suited for the case of FIG. 8*a*. The heads 95, 96 and 97 of FIG. 8*a* are shown in their positions on the assembly of FIGS. 8*b* and 8*c*. Of course more than two heads which track in a complementary manner may be employed. Switching of the heads may be performed during the vertical blanking period or during the redundant scan time, such as shown by any thin line locus in FIG. 1*b*. If the horizontal recorded signal paths are arranged in substantially parallel by suitable design, these complementary heads may be simultaneously used to add to their outputs.

FIG. 8*d* shows an example of a switching circuit in block schematic form suitable for use during playback with the arrangement shown in FIGS. 8*a*, 8*b*, and 8*c*. The output signals from the complementary heads 95 and 96 are fed to a switch 166 via amplifiers 160 and 161, respectively. The switching of switch 166 is controlled by the output from an amplitude comparator 165, so as to switch from the head having a smaller output to the head having the larger output. Additional heads 168 and 169 may also be employed, and switched with suitable similar circuitry as is employed with the heads 95 and 96, as seen in FIG. 8*d*.

FIG. 9 shows an apparatus modified from the apparatus shown in FIG. 1*a*, in which three heads 98, 99 and 100 are employed instead of two and the wrapping angle is approximately 250 degrees. In this case the marker means can be large enough for the head to reproduce a large amplitude. Of course, more than three heads may be used in which case a still smaller wrapping angle than 250° would be used.

The recording system according to the present invention is not only suitable for the tape form medium, but it can be applied when, for example, a magnetic drum is employed on which there is a discontinuity. FIG. 10*a* shows an example of discontinuity as numeral 104 on the drum. FIG. 10*b* shows the side view of the drum of FIG. 10*a* in cross section. Four heads 105, 106, 107 and 108 are switched sequentially to yield a helical scanning locus. FIG. 10*c* shows an example of such locus. The groups of the tracks indicated as 109, 110, 111 and 112 are produced by the heads 105, 106, 107 and 108, respectively, on the recording medium 113.

For the assembly of FIGS. 10*a* and 10*b*, switching means of the type described above may be employed. In the case of disc recording in a spiral locus the invention is applicable as above in much the same manner.

The record-reproducing system according to the present invention enables simplified construction, thus eliminating the servo means heretofore required for the head motor during recording. Additionally, with the complementary head system for reproducing, there is no necessity for the capstan or the head motor servo means. The improved apparatus according to the invention also allows quick response and stable operation. Still further advantages are very small size, light weight and reduced cost.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A recording and reproducing system for recording an approximately periodical signal on a recording medium for future reproduction, comprising input terminal means to which said periodical signal is supplied during the recording operation, output terminal means from which the recorded signal is taken during the reproducing operation, recording and reproducing transducer means, first coupling means for electrically coupling said transducer means to said input terminal means, second coupling means for electrically coupling said transducer means to said output terminal means, scanning means for causing said transducer means to repeatedly scan said recording medium in a predetermined direction, transporting means for moving said recording medium relative to said transducer means in a direction to intersect a line along said predetermined direction, recording boundaries on said recording medium, said scanning means and said transporting means cooperating to define on said recording medium a recorded pattern comprising substantially parallel paths having their ends substantially at said boundaries, each of said parallel paths being arranged so as to contain a recorded length corresponding to at least one of the approximate periods of said periodical signal and to contain a redundant portion corresponding to the predicted maximum deviation of at least one of the frequency and phase of the repeating scan of said scanning means from the corresponding frequency and phase of said periodical signal, and control means responsive to said recorded signals at said boundaries for producing control signals to be supplied to said coupling means to selectively energize at least one of said first and said second coupling means for at least one of the approximate periods of said periodical signal while each of said parallel paths is scanned by said transducer means.

2. A recording and reproducing system as set forth in claim 1, wherein said periodical signal is a video signal, said approximate period being the period of the frame or field defined by the successive vertical blanking periods of said video signal, said control means comprises first detecting means responsive to said vertical blanking periods for producing first control signals, and a gate pulse generator responsive to said first control signals for producing a gating pulse series, said coupling means comprises gating means adapted to be supplied with the gate pulses to be opened for at least one of the periods of the frame or field while each of said parallel paths is scanned by said transducer means, said control means further comprises second detecting means for producing at least one second control signal when that transducer means for which the coupling means is being energized scans said boundaries, and selecting means responsive to said second control signal for altering the phase of said gating pulse series.

3. A recording said reproducing system as set forth in claim 2, wherein said transducer means comprises a plurality of transducer groups, each of said groups containing at least one transducer, said gating means comprises a plurality of gating circuits each assigned to each of said transducer groups and adapted to be supplied with said gate pulse series to be open for at least one of said periods of the frame or field while one of said parallel paths is scanned by the assigned transducer group, and said selecting means alters the phase of said gating pulse series so that only the gating circuits which are assigned to the transducer groups which do not scan said boundaries may be energized.

4. A recording and reproducing system as set forth in claim 1, wherein said periodical signal is a video signal, said approximate period being the period of the frame or field defined by the successive vertical blanking periods of said video signal, said transducer means comprises a plurality of transducer groups, each of said groups containing at least one transducer, said control means comprises first detecting means responsive to said vertical blanking periods for producing first control signals, and a gate pulse generator responsive to said first control signals for producing a gating pulse series, said coupling means comprises a plurality of gate circuits assigned to said transducer groups and adapted to be supplied with said gating pulse series to become open for at least one of said periods of the frame or field while each of said parallel paths is scanned by that transducer group which is assigned thereto, said control means further comprises second detecting means for producing at least one second control signal when that transducer group for which the assigned gate circuit is open scans said boundaries, and said coupling means further comprises switching means interposed between said gate circuits and said terminal means and adapted to be supplied with said second control signal and to connect at least one of said gating circuits with said terminal means wherein said second detecting means does not produce said second control signal.

5. A recording and reproducing system as set forth in claim 1, wherein said periodical signal is a video signal, said approximate period being the period of the frame or field defined by the successive vertical blanking periods of said video signal, said transducer means comprises a plurality of transducer groups, each of said groups containing at least one transducer, said control means comprises first detecting means responsive to said vertical blanking period for producing first control signals, and a gate pulse generator responsive to said first control signals for producing a gate pulse series, said coupling means comprises a plurality of gate circuits assigned to said transducer groups and adapted to be supplied with said gate pulse series to become open for at least one of the period of the frame or field while each of said parallel paths is scanned by that transducer group which is assigned thereto, said control means further comprises second detecting means for producing at least one second control signal when that transducer group for which the assigned gate circuit is open scans said boundaries, and selecting means responsive to said second control signal for altering the phase of said gating pulse series.

and said coupling means further comprises switching means interposed between said gate circuits and said terminal means and adapted to be also supplied with said second control signal and to connect at least one of said gating circuits with said terminal means when said second detecting means does not produce said second control signal.

6. A recording and reproducing system as set forth in claim 1, wherein said control means is coupled to said terminal means.

7. A recording and reproducing system as set forth in claim 1, wherein said control means is disposed adjacent at least one of the points of intersection of the transducer path defined by the repeating scan of said transducer means and the boundary path defined by said boundaries on said recording medium.

8. A recording and reproducing system as set forth in claim 1, wherein said redundant portion is of a length corresponding substantially to an integral multiple of the approximate period of said periodical signal.

9. A recording and reproducing system as set forth in claim 1, wherein said transducer means comprises transducer means $2m$ in number, where $m$ is a positive integer, each of said groups containing at least one transducer, and said redundant portion is of a length corresponding substantially to $1/m$ of the approximate period of said periodical signal.

10. A recording and reproducing system as set forth in claim 1, wherein said transducer means comprises transducer groups $2m$ in number, where $m$ is a positive integer, each of said groups containing at least one transducer, and said redundant portion is of a length corresponding to such a time interval which is shorter than $1/m$ of the approximate period of said periodical signal as may be determined by the predicted maximum deviation of the phase of the repeating scan of said scanning means for the phase of said periodical signal.

11. A recording and reproducing system as set forth in claim 1, wherein said transducer means comprises a plurality of transducer groups, each of said groups containing at least one transducer, said scanning means comprises a rotatable drum carrying said transducer groups in such an axially spaced relation that the one of the transducers of one of said transducer groups may scan said recording medium along that same one of said parallel paths which is scanned by such ones of the transducer groups disposed axially adjacent to said first-mentioned transducer group as may be peripherally adjacent to the first-mentioned transducer.

12. A recording and reproducing system as set forth in claim 1, wherein said recording medium is in sheet form, a cylinder is provided for carrying said recording medium in close contact with the peripheral surface thereof, said transducer means comprises at least one transducer arranged in proximity to said peripheral surface and movable relative thereto, said scanning means drives said at least one transducer relatively along the circumference of said cylinder, and said transporting means drives said cylinder relative to said at least one transducer in a direction parallel to the axis of said cylinder.

13. A reproducing system according to claim 1, wherein said recording medium has recorded tracks along some of said parallel paths, and said transducer means comprises at least two transducers arranged in such a manner that when said scanning means and said transporting means in combination cause one of said transducers to scan along one of said tracks, at least one of said parallel paths scanned by all of the remaining transducers may be dislocated from said tracks.

References Cited by the Examiner

UNITED STATES PATENTS

| | | | |
|---|---|---|---|
| 3,152,223 | 10/1964 | Wessells | 178—6.6 |
| 3,157,739 | 11/1964 | Okamura | 178—6.6 |

DAVID G. REDINBAUGH, *Primary Examiner.*

H. W. BRITTON, *Assistant Examiner.*